United States Patent
Ko et al.

(10) Patent No.: US 9,414,041 B2
(45) Date of Patent: Aug. 9, 2016

(54) METHOD FOR CHANGING PLAY MODE, METHOD FOR CHANGING DISPLAY MODE, AND DISPLAY APPARATUS AND 3D IMAGE PROVIDING SYSTEM USING THE SAME

(75) Inventors: Chang-seog Ko, Hwaseong-si (KR); Ji-youn Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1076 days.

(21) Appl. No.: 12/943,637

(22) Filed: Nov. 10, 2010

(65) Prior Publication Data
US 2011/0122127 A1 May 26, 2011

(30) Foreign Application Priority Data

Nov. 23, 2009 (KR) .................. 10-2009-0113243
Nov. 23, 2009 (KR) .................. 10-2009-0113248

(51) Int. Cl.
| | | |
|---|---|---|
| G06T 15/00 | (2011.01) | |
| H04N 13/00 | (2006.01) | |
| H04N 13/04 | (2006.01) | |
| H04N 21/41 | (2011.01) | |

(Continued)

(52) U.S. Cl.
CPC ....... *H04N 13/0029* (2013.01); *H04N 13/0066* (2013.01); *H04N 13/0438* (2013.01); *H04N 13/0454* (2013.01); *H04N 13/0456* (2013.01); *H04N 21/4104* (2013.01); *H04N 21/44218* (2013.01); *H04N 21/816* (2013.01); *H04N 21/44236* (2013.01); *H04N 2213/007* (2013.01); *H04N 2213/008* (2013.01)

(58) Field of Classification Search
CPC ............... H04N 13/0454; H04N 19/00769; H04N 13/026; H04N 13/0456; H04N 13/0452; H04N 13/004; H04N 13/0285; H04N 13/00; G06T 2207/10012; G06T 7/0065; G06T 2207/10021
USPC .............. 382/154, 51, 42, E13.044, E13.001, 382/E13.026; 345/154, 51, 42, E13.044, 345/E13.001, E13.026

See application file for complete search history.

(56) References Cited

U.S. PATENT DOCUMENTS

| | | | |
|---|---|---|---|
| 2003/0097659 A1 | 5/2003 | Goldman | |
| 2006/0061652 A1 | 3/2006 | Sato et al. | |
| 2006/0279750 A1* | 12/2006 | Ha | ................................. 358/1.2 |

(Continued)

FOREIGN PATENT DOCUMENTS

| | | | |
|---|---|---|---|
| JP | 11-75223 A | 3/1999 | |
| JP | 2000-4453 A | 1/2000 | |

(Continued)

OTHER PUBLICATIONS

Communication, dated Mar. 18, 2014, issued by the European Patent Office in counterpart European Patent Application No. 10191295.4.

(Continued)

*Primary Examiner* — Jeffrey Chow
(74) *Attorney, Agent, or Firm* — Sughrue Mion, PLLC

(57) ABSTRACT

A play mode changing method, a display mode changing method, and a display apparatus and a three-dimensional (3D) image providing system using the same are provided. The method for changing a play mode includes: receiving state information regarding shutter glasses from the shutter glasses; and based on the received state information, performing one of changing the play mode and displaying a message for changing the play mode.

36 Claims, 17 Drawing Sheets

(51) Int. Cl.
*H04N 21/442* (2011.01)
*H04N 21/81* (2011.01)

(56) References Cited

U.S. PATENT DOCUMENTS

2010/0085424 A1* 4/2010 Kane et al. .................. 348/53
2011/0012896 A1* 1/2011 Ji ................................ 345/419
2012/0062711 A1* 3/2012 Ikeda et al. .................. 348/51

FOREIGN PATENT DOCUMENTS

JP 2006084964 A 3/2006
JP 2006-196995 A 7/2006

OTHER PUBLICATIONS

Bluetooth SIG (Usability Expert Group): "Bluetooth User Interface Flow Diagrams for Bluetooth Secure Simple Pairing Devices," Sep. 13, 2007, pp. 1-54, https://www.bluetooth.org/Technical/Specifications/whitepapers.htm.
Communication, dated for Nov. 22, 2013, issued by the European Patent Office in counterpart European Application No. 10191295.4.
Communication issued Oct. 8, 2015 by the Korean Intellectual Property Office in counterpart Korean Application No. 10-2009-0113248.
Communication from the Korean Intellectual Property Office dated Nov. 20, 2015 in counterpart Korean Patent Application No. 10-2009-0113243.

* cited by examiner

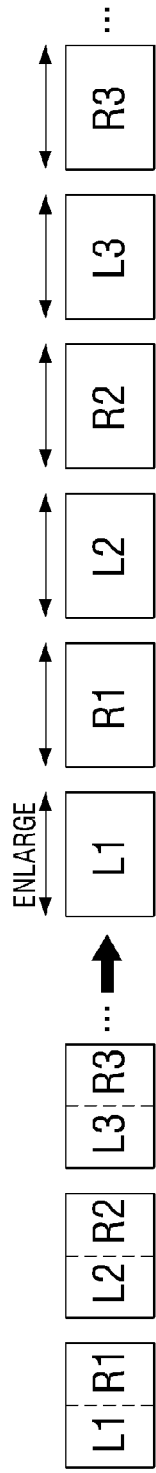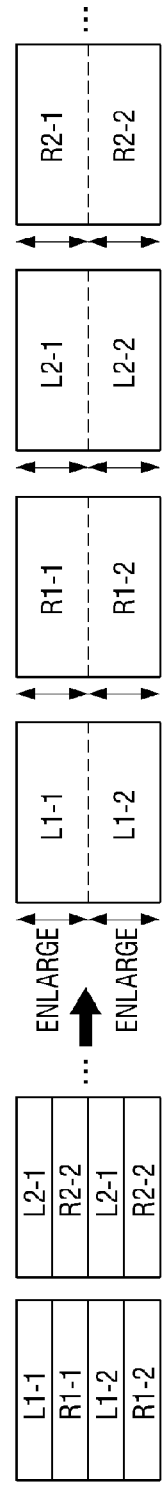

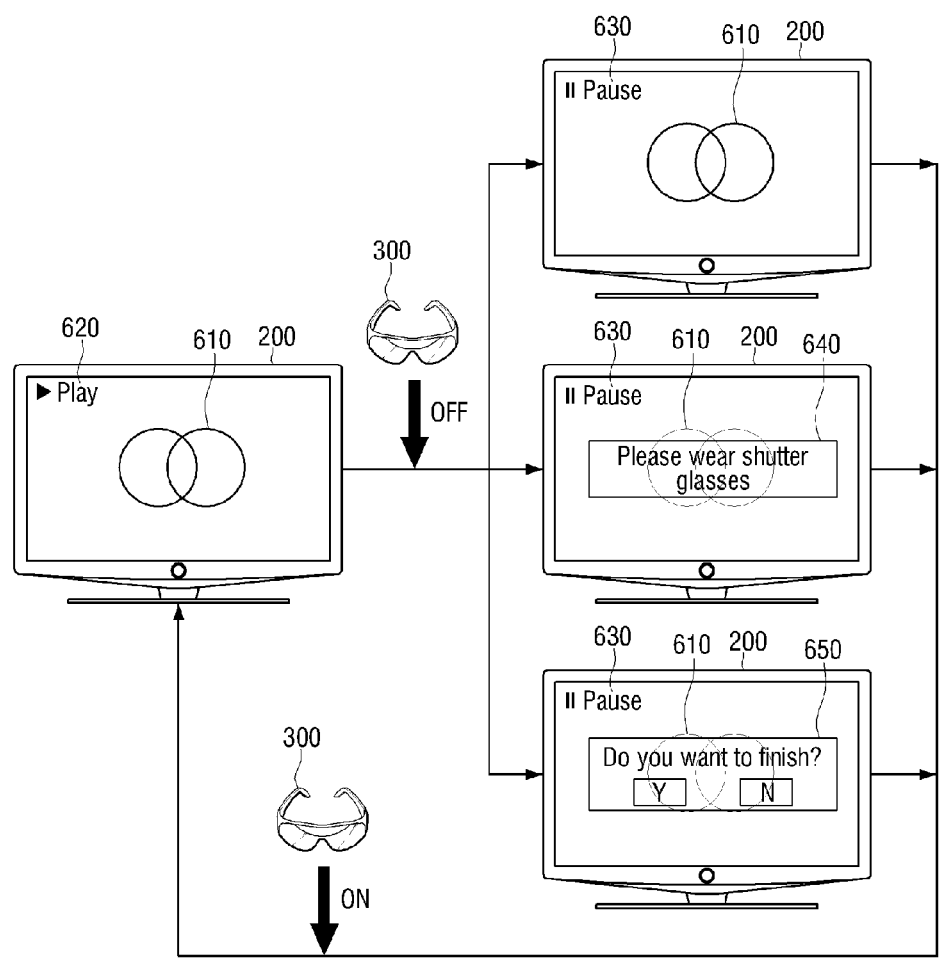

US 9,414,041 B2

METHOD FOR CHANGING PLAY MODE, METHOD FOR CHANGING DISPLAY MODE, AND DISPLAY APPARATUS AND 3D IMAGE PROVIDING SYSTEM USING THE SAME

CROSS-REFERENCE TO RELATED APPLICATION

This application claims priority from Korean Patent Application No. 10-2009-0113243, filed on Nov. 23, 2009, and No. 10-2009-0113248, filed on Nov. 23, 20009 in the Korean Intellectual Property Office, the disclosure of which is incorporated herein by reference in its entirety.

BACKGROUND OF THE INVENTION

1. Field of the Invention

Aspects of the present inventive concept relate to a method for changing a play mode, a method for changing a display mode, and a display apparatus and a three-dimensional (3D) image providing system using the same. More particularly, aspects of the present inventive concept relate to a method for changing a play mode for a 3D image, a method for changing a display mode for a 3D image, and a display apparatus and a 3D image providing system.

2. Description of the Related Art

Three-dimensional (3D) stereoscopy is applied to diverse fields such as information communication, broadcasting, medical service, education and training, military, games, animation, virtual reality, CAD, and industrial technologies, and is the core base technology of next generation 3D stereoscopic multimedia information communication, which is commonly required in the aforementioned diverse fields.

The stereoscopic sense that a person generally perceives is generated by the complex action of diverse factors, such as a degree of change in thickness of eye lens according to the location of an object to be observed, an angle difference between both eyes and the object, a difference in location and shape of the object observed from the right and left eyes, a time difference generated by movement of the object, and other diverse psychological and memory effects.

Among them, binocular disparity which appears due to the horizontal separation of about 6-7 cm between the two eyes of a person is among the most important factors in the stereoscopic sense. That is, a person observes an object with an angle difference due to the binocular disparity and thus images entering the two eyes have different images. If these two images are transmitted to the brain through the retinas, the brain accurately combines two pieces of information and thus perceives an original 3D stereoscopic image.

Stereoscopic image display apparatuses are divided into a glass type using special glasses and a non-glass type without using special glasses. The glass type employs a color filter scheme which separates and selects an image using complementary color filters, a polarization filter scheme which separates a left-eye image and a right-eye image using a light shielding effect obtained by combination of orthogonal polarization elements, and a shutter glass scheme which alternately shades the left-eye and the right-eye in response to a synchronization signal which projects a left-eye image signal and a right-eye image signal onto a screen, thereby allowing the person to perceive the stereoscopic sense.

The shutter glass scheme, which displays the image using the binocular disparity, synchronizes the image presentation of the display apparatus with the on-off state of left-eye and right-eye glasses such that the person perceives the stereoscopic sense of the image observed from different angles through the brain processing.

Users may change various settings for the stereoscopic image in order to watch it more conveniently. However, a related-art method for setting for a stereoscopic image requires a user's direct manipulation on a menu, which may cause inconvenience to the user.

Therefore, there is a need for a method for actively considering a user's intention and changing a play mode and a display mode for a 3D image according to the user's intention.

SUMMARY OF THE INVENTION

Exemplary embodiments may overcome the above disadvantages and other disadvantages not described above. However, it is understood that an exemplary embodiment of the present inventive concept is not required to overcome the disadvantages described above, and an exemplary embodiment may not overcome any of the problems described above.

Exemplary embodiments provide a method for changing a play mode and a method for changing a display mode, which automatically change the play mode and the display mode for a three-dimensional (3D) image, and a display apparatus and a 3D image providing system using the same.

An aspect of the present invention provides a method for changing a play mode for a three-dimensional (3D) image, wherein the method may include: receiving state information regarding shutter glasses from the shutter glasses; and based on the received state information, performing one of changing the play mode and displaying a message for changing the play mode.

The state information may indicate at least one of a power on/off state, a battery charging state and an opening and closing state of the shutter glasses.

The performing the one of the changing and the displaying may include automatically pausing playing the 3D image if the received state information indicates the shutter glasses are turned off while the 3D image is being played.

The performing the one of the changing and the displaying may include automatically playing the 3D image if the received state information indicates the shutter glasses are turned on while playing the 3D image is paused.

If the received state information indicates the shutter glasses are turned off while the 3D image is being played, the method may further include displaying a request message requesting the shutter glasses to be turned on.

The method may further include terminating the displaying of the request message if new state information is received indicating the shutter glasses are turned on after receiving the state information indicating that the shutter glasses are turned off.

The performing one of the changing and the displaying may include displaying a message asking whether to play the 3D image if the received state information indicates the shutter glasses are turned on while playing of the 3D image is paused.

The shutter glasses may transmit the state information based on at least one of a predetermined time interval and whether a request for the state information is received.

Another aspect of the present invention provides a method for changing between a three-dimensional (3D) display mode and a two-dimensional (2D) display mode, wherein the method may include: receiving state information regarding shutter glasses from the shutter glasses; and based on the received state information, performing one of changing the 3D display mode to the 2D display mode, changing the 2D display mode to the 3D display mode, displaying a first message for changing from the 3D display mode to the 2D display mode and displaying a second message for changing from the 2D display mode to the 3D display mode.

The state information may indicate at least one of a power on/off state, a battery charging state and an opening and closing state of the shutter glasses.

The received state information may indicate the shutter glasses are turned off while in the 3D display mode, the performing the one of the changing from the 3D display mode to the 2D display mode, and the displaying of the first message automatically changes the 3D display mode to the 2D display mode.

The received state information may indicate the shutter glasses are turned on while in the 2D display mode, the performing the one of the changing from the 2D display mode to the 3D display mode and the displaying of the second message automatically changes from the 2D display mode to the 3D display mode.

The method may further include displaying a third message requesting the shutter glasses to be turned on if the received state information indicates the shutter glasses are turned off while in the 3D display mode.

The method may further include terminating the displaying of the third message if new state information is received indicating that the shutter glasses are turned on after receiving the received state information indicating that the shutter glasses are turned off.

If the received state information indicates the shutter glasses are turned on while in the 2D display mode, the performing the one of the changing from the 2D display mode to the 3D display mode and the displaying of the second message may display a message asking whether to change to the 3D display mode.

The method as claimed in claim 9, wherein the shutter glasses transmit the state information based on at least one of a predetermined time interval or whether a request for the state information is received.

The 3D display mode may be a mode in which a left-eye image and a right-eye image of a 3D image are displayed alternately on a screen, and the 2D display mode may be a mode in which the left-eye image and the right-eye image are separately displayed on the screen.

Another aspect of the present invention provides a display apparatus for displaying a three-dimensional (3D) image, wherein the display apparatus may include: a communication interface which receives state information regarding shutter glasses from the shutter glasses; and a controller which is operable to change a play mode based on the received state information and operable to control a displaying of a message for changing the play mode based on the received state information.

The state information may indicate at least one of a power on/off state, a battery charging state and an opening and closing state of the shutter glasses.

If the received state information indicates the shutter glasses are tuned off while the 3D image is being played, the controller may automatically pause playing of the 3D image.

If the received state information indicates the shutter glasses are turned on while playing of the 3D image is paused, the controller may automatically play the 3D image.

If the received state information indicates the shutter glasses are turned off while the 3D image is being played, the controller may control a displaying of a request message requesting the shutter glasses to be turned on.

If new state information is received indicating the shutter glasses are turned on after receiving the received state information indicating that the shutter glasses are turned off, the controller may terminate the displaying of the request message.

If the received state information indicates the shutter glasses are turned on while playing the 3D image is paused, the controller may display a 3D image playing message asking whether to play the 3D image.

The shutter glasses may transmit the state information based on at least one of a predetermined time interval and whether a request for the state information is received.

Another aspect of the present invention provides a display apparatus which operates in a three-dimensional (3D) display mode and a two-dimensional (2D) display mode, wherein the display apparatus may include: a communication interface which receives state information regarding shutter glasses from the shutter glasses; and a controller which, based on the received state information, performs one of changing a display mode and displaying a message for changing the display mode.

The state information may indicate at least one of a power on/off state, a battery charging state and an opening and closing state of the shutter glasses.

If the received state information indicates the shutter glasses are turned off while in the 3D display mode, the controller may automatically change from the 3D display mode to the 2D display mode.

If the received state information indicates the shutter glasses are turned on while in the 2D display mode, the controller may automatically changes from the 2D display mode to the 3D display mode.

If the received state information indicates the shutter glasses are turned off while in the 3D display mode, the controller may control a displaying of a request message requesting the shutter glasses to be turned on.

If new state information is received indicating the shutter glasses are turned on after displaying the request message, the controller may terminate the displaying of the request message.

If the received state information indicates the shutter glasses are turned on while in the 2D display mode, the controller may control a displaying of a 3D playing message asking whether to change to the 3D display mode.

The shutter glasses may transmit the state information based on one of a predetermined time interval and whether a request for the state information is received.

In the 3D display mode, a left-eye image and a right-eye image of a 3D image may be displayed alternately on a screen, and in the 2D display mode, the left-eye image and the right-eye image may be separately displayed on the screen.

Another aspect of the present invention provides a three-dimensional (3D) image providing system, wherein the system may include: shutter glasses which open and close a left-eye glass and a right-eye glass alternately based on a sync signal received from an external source, and transmit state information regarding the shutter glasses; and a display apparatus which receives the state information, and based on the received state information, performs one of changing a play mode and displaying a message for changing the play mode.

Another aspect of the present invention provides a three-dimensional (3D) image providing system, wherein the system may include: shutter glasses which open and close a left-eye glass and a right-eye glass alternately based on a sync signal received from an external source, and transmit state information regarding the shutter glasses to the outside; and a display apparatus which is operable in a 3D display mode and a two-dimensional (2D) display mode, receives the state information, and based on the received state information, performs one of changing a display mode and displaying a message for changing the display mode.

Additional aspects of the present invention will be set forth in the detailed description, will be obvious from the detailed description, or may be learned by practicing the invention.

BRIEF DESCRIPTION OF THE DRAWING FIGURES

The above and/or other aspects will be more apparent by describing in detail exemplary embodiments, with reference to the accompanying drawings in which:

FIGS. 5A to 5C are views illustrating methods for processing a 3D image according to formats;

FIG. 6 is a view to explain a process of changing a screen when the shutter glasses are turned on;

FIG. 10 is a view illustrating a process of changing a screen when the shutter glasses are turned on;

DETAILED DESCRIPTION OF THE EXEMPLARY EMBODIMENTS

Figure 1:
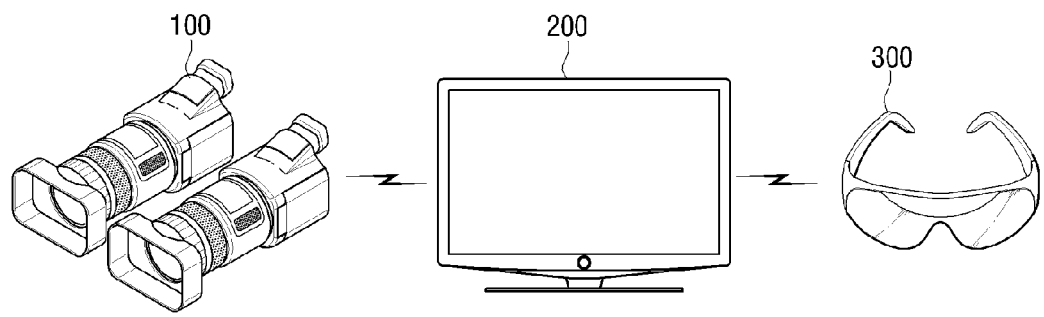
FIG. 1 is a view illustrating a three-dimensional (3D) image providing system according to an exemplary embodiment.

Hereinafter, exemplary embodiments will be described in greater detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the invention with unnecessary detail.

The operation and configuration of a 3-dimensional (3D) image providing system according to an exemplary embodiment will be explained with reference to FIGS. 1 to 4, and a method for processing a 3D image will be explained with reference to FIGS. 5A to 5C. Also, a method for changing a play mode will be explained with reference to FIGS. 6 to 9, and a method for changing a display mode will be explained with reference to FIGS. 10 to 14.

<Operation and Configuration of the 3D Image Providing System>

FIG. 1 is a view illustrating a 3D image providing system according to an exemplary embodiment. As shown in FIG. 1, the 3D image providing system includes a camera 100 to generate a 3D image, a television (TV) 200 to display the 3D image on a screen, and shutter glasses 300 to watch the 3D image.

The camera 100 is a kind of a photographing apparatus to generate a 3D image. More specifically, the camera 100 generates a left-eye image which is photographed to be provided to the left-eye of a user, and a right-eye image which is photographed to be provided to the right-eye of the user. That is, the 3D image consists of the left-eye image and the right-eye image and the left-eye image and the right-eye image are alternately provided to the left-eye and the right-eye of the user such that the user perceives the stereoscopic sense due to the binocular disparity.

To achieve this, the camera 100 includes a left-eye camera for generating the left-eye image and a right-eye camera for generating the right-eye image, and the gap between the left-eye camera and the right-eye camera is determined based on the distance between the two eyes of the user.

The camera 100 transmits the photographed left and right-eye images to the TV 200. In detail, the camera 100 transmits the left and right-eye images to the TV 200 in a format in which one of the left-eye image and the right-eye image is included in one frame or in a format in which both the left-eye image and the right-eye image are included in one frame.

Hereinafter, formats of the 3D image to be transmitted to the TV 200 will be described in detail with reference to FIGS. 2A to 2F.

FIGS. 2A to 2F are views illustrating the formats of the 3D image. In FIGS. 2A to 2F, the left-eye image is illustrated white and the right-eye image is illustrated black for the convenience of explanation.

Figure 2A:
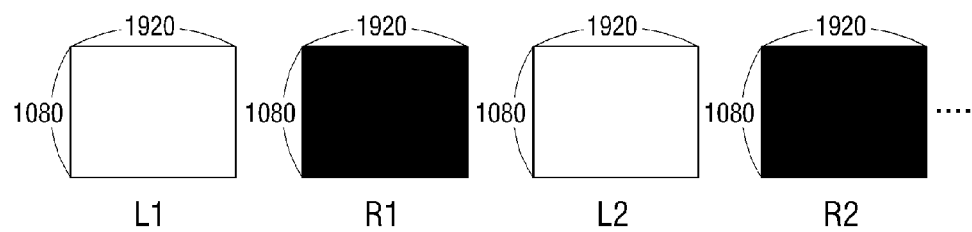
FIGS. 2A to 2F are views to explain the formats of a 3D image.

FIG. 2A is a view illustrating a 3D image format according to a general frame sequence scheme. According to the frame sequence scheme, the 3D image format includes one left-eye image or one right-eye image in one frame.

A 3D image of this format, having a resolution of 1920*1080, consists of a frame including a left-eye image L1 photographed by the left-eye camera, a frame including a right-eye image R1 photographed by the right-eye camera, a frame including a left-eye image L2 photographed by the left-eye camera, a frame including a right-eye image R2 photographed by the right-eye camera, and so on.

Figure 2B:
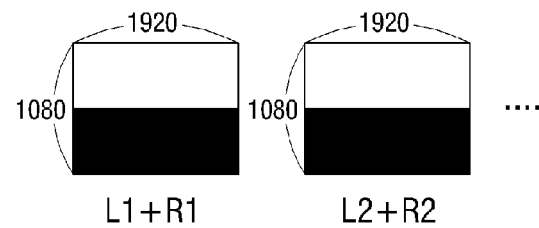

FIG. 2B is a view illustrating a 3D image format according to a top-bottom scheme. In the 3D image format of the top-bottom scheme, one frame includes both the left-eye image and the right-eye image. In detail, in the 3D image format of the top-bottom scheme, the left-eye image and the right-eye image are divided vertically and are located on the top and the bottom, respectively.

To achieve this, the left-eye image and the right-eye image photographed by the camera 100 are down-scaled in a vertical direction to be converted to a resolution of 1920*540. After that, the down-scaled left-eye image and the down-scaled right-eye image are combined with each other vertically to have a resolution of 1920*1080 and thus configure a single frame. The frame is transmitted to the TV 200.

A 3D image of this format, having a resolution of 1920*1080, consists of a frame including a left-eye image L1 (top) photographed by the left-eye camera and a right-eye image R1 (bottom) photographed by the right-eye camera, a frame including a left-eye image L2 (top) photographed by the left-eye camera and a right-eye image R2 (bottom) photographed by the right-eye camera, and so on.

Figure 2C:
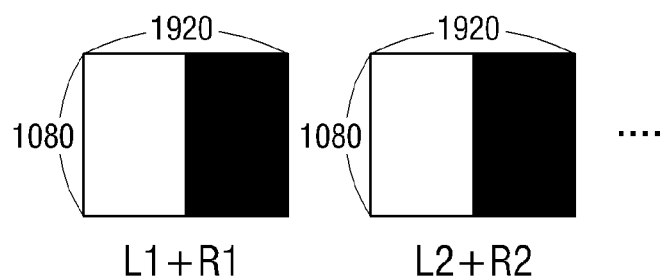

FIG. 2C is a view illustrating a 3D image format according to a side by side scheme. According to the side by side scheme, the 3D image format includes both the left-eye image and the right-eye image in one frame. In detail, in the 3D image format according to the side by side scheme, the left-eye image and the right-eye image are divided horizontally and are located on the left and the right, respectively.

To achieve this, the left-eye image and the right-eye image photographed by the camera 100 are down-scaled in a horizontal direction to be converted to a resolution of 960*1080. After that, the down-scaled left-eye image and the down-scaled right-eye image are combined with each other horizontally to have a resolution of 1920*1080 and thus configure a single frame. The frame is transmitted to the TV 200.

A 3D image of this format, having a resolution 1920*1080, consist of a frame including a left-eye image L1 (left) photographed by the left-eye camera and a right-eye image R1 (right) photographed by the right-eye camera, a frame including a left-eye image L2 (left) photographed by the left-eye camera and a right-eye image R2 (right) photographed by the right-eye camera, and so on.

Figure 2D:
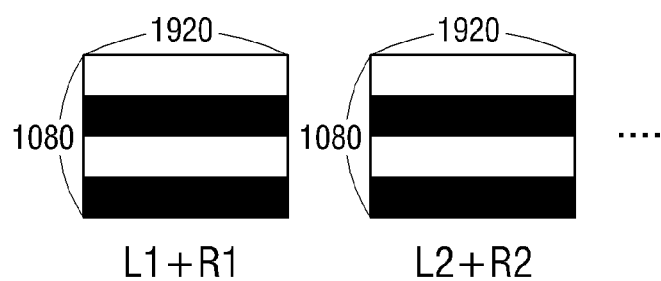

FIG. 2D is a view illustrating a 3D image format according to a horizontal interleave scheme. According to the horizontal interleave scheme, the 3D image format includes both the left-eye image and the right-eye image in one frame. In detail, in the 3D image format according to the horizontal interleave scheme, the left-eye image and the right-eye image are alternated on the row basis.

To achieve this, (1) the left-eye image and the right-eye image photographed by the camera 100 are down-scaled in a vertical direction to be converted to a resolution 1920*540 and then the converted left-eye image and the converted right-eye image are alternated in odd rows or even rows on the row basis, such that one frame is constituted. Alternatively, (2) only odd row images are extracted from the left-eye image and only even row images are extracted from the right-eye image and the odd row images and the even row images are combined such that one frame is constituted.

For example, in the 3D image format of above method (1), a single frame consists of the first row of a left-eye image L1 photographed by the left-eye camera, the first row of a right-eye image R1 photographed by the right-eye camera, the second row of the left-eye image L1 photographed by the left-eye camera, the second row of the right-eye image R1 photographed by the right-eye camera, and so on.

The next frame consists of the first row of a left-eye image L2 photographed by the left-eye camera, the first row of a right-eye image R2 photographed by the right-eye camera, the second row of the left-eye image L2 photographed by the left-eye camera, the second row of the right-eye image R2 photographed by the right-eye camera, and so on.

Figure 2E:
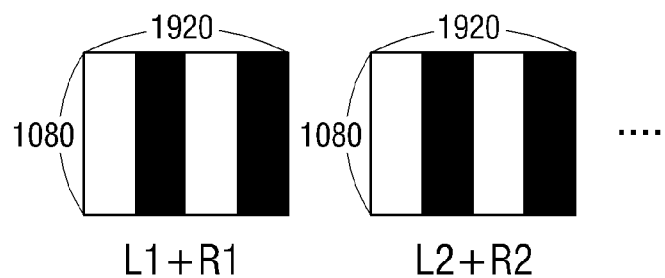

FIG. 2E is a view illustrating a 3D image format according to a vertical interleave scheme. According to the vertical interleave scheme, the 3D image format includes both the left-eye image and the right-eye image in one frame. In detail, in the 3D image format of the vertical interleave scheme, the left-eye image and the right-eye image are alternated in the column basis.

To achieve this, (1) the left-eye image and the right-eye image photographed by the camera 100 are down-scaled in a horizontal direction to be converted to a resolution of 960*1080 and then the converted left-eye image and the converted right-eye image are alternated odd columns or even columns in the column basis, such that a single frame is constituted. Alternatively, (2) only odd column images are extracted from the left-eye image and only even column images are extracted from the right-eye image and the odd column images and the even column images are combined such that a single frame is constituted.

For example, in the 3D image format according to the method (1), a single frame consists of the first column of a left-eye image L1 photographed by the left-eye camera, the first column of a right-eye image R1 photographed by the right-eye camera, the second column of the left-eye image L1 photographed by the left-eye camera, the second column of the right-eye image R1 photographed by the right-eye camera, and so on.

The next frame consists of the first column of a left-eye image L2 photographed by the left-eye camera, the first column of a right-eye image R2 photographed by the right-eye camera, the second column of the left-eye image L2 photographed by the left-eye camera, the second column of the right-eye image R2 photographed by the right-eye camera, and so on.

Figure 2F:
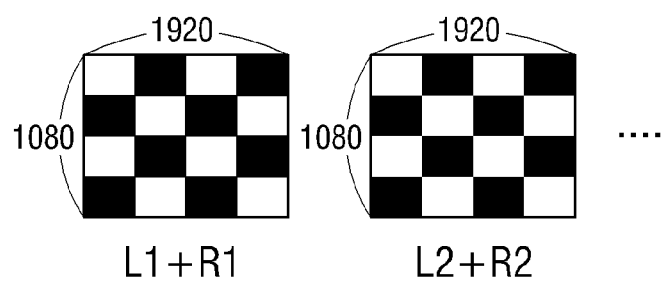

FIG. 2F is a view illustrating a 3D image format according to a checker board scheme. According to the checker board scheme, the 3D image format includes both the left-eye image and the right-eye image in one frame. In detail, in the 3D image format of the checker board scheme, the left-eye image and the right-eye image are alternated on the pixel basis or the pixel group basis.

To achieve this, the left-eye image and the right-eye image photographed by the camera 100 are extracted on the pixel basis or the pixel group basis and are alternated in the pixels or pixel groups constituting each frame.

For example, in the 3D image format according to the checker board scheme, a single frame consists of the first row and the first column of a left-eye image L1 photographed by the left-eye camera, the first row and the second column of a right-eye image R1 photographed by the right-eye camera, the first row and the third column of the left-eye image L1 photographed by the left-eye camera, the first row and the fourth column of the right-eye image R1 photographed by the right-eye camera, and so on.

The next frame consist of the first row and the first column of a left-eye image L2 photographed by the left-eye camera, the first row and the second column of a right-eye image R2 photographed by the right-eye camera, the first row and the third column of the left-eye image (L2) photographed by the left-eye camera, the first row and the fourth column of the right-eye image R2 photographed by the right-eye camera, and so on.

Referring back to FIG. 1, the camera 100 determines one of the above-described formats in advance and transmits the 3D image to the TV 200 according to the determined format.

The TV 200, which is a kind of a display apparatus, receives a 3D image from a photographing apparatus such as the camera 100 or a 3D image, which has been photographed by the camera 100 and edited/processed by a broadcasting station, and processes the received 3D image and displays it on the screen. In detail, the TV 200 processes the left-eye image and the right-eye image with reference to the format of the 3D image and time-divides the processed left-eye image and right-eye image to thus display them alternately.

Also, the TV 200 generates a synchronization (hereinafter, "sync") signal which is synchronized with the timing when the left-eye image and the right image are time-divided and displayed, and transmits the sync signal to the shutter glasses 300.

Figure 3:
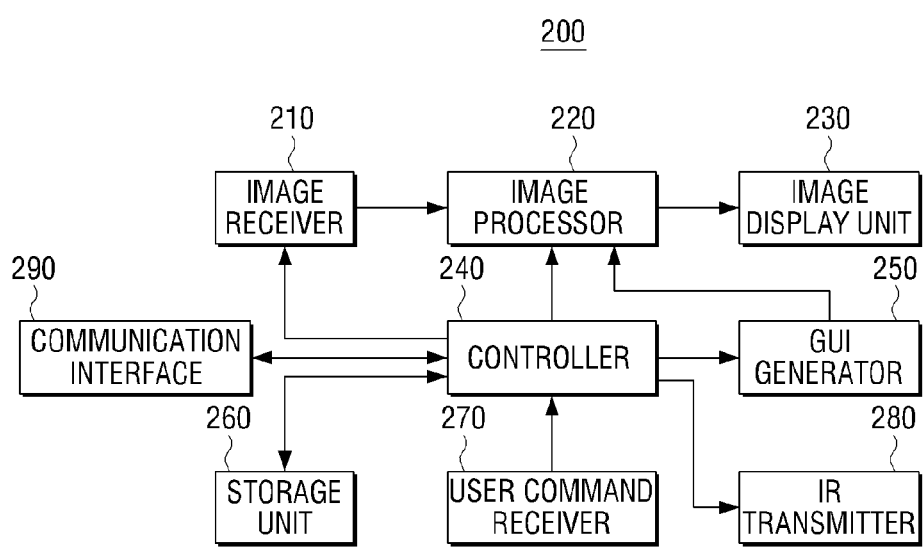
FIG. 3 is a block diagram illustrating a television (TV) according to an exemplary embodiment.

The TV 200 will be explained in detail with reference to FIG. 3. FIG. 3 is a block diagram illustrating the TV 200 according to an exemplary embodiment.

As shown in FIG. 3, the TV 200 includes an image receiver 210, an image processor 220, an image display unit 230, a controller 240, a graphic user interface (GUI) generator 250, a storage unit 260, a user command receiver 270, an infrared ray (IR) transmitter 280, and a communication interface 190.

The image receiver 210 receives a broadcast from a broadcasting station or a satellite in a wire or wireless manner and demodulates it. Also, the image receiver 210 is connected to an external apparatus such as the camera 100 to receive a 3D image from the external apparatus. The TV 200 may be connected to the external apparatus in a wireless manner or in a wired manner through an interface such as S-Image, component, composite, D-Sub, DVI, and HDMI.

As described above, the 3D image consists of at least one frame, and includes both a left-eye image and a right-eye image in one frame or includes either one in one frame. That is, the 3D image is generated according to one of the above-described formats, illustrated in FIGS. 2A to 2F. Accordingly, the 3D image received by the image receiver 210 may have diverse formats, in particular, have a format according to one of the general frame sequence scheme, the top-bottom scheme, the side by side scheme, the horizontal interleave scheme, the vertical interleave scheme, and the checker board scheme.

The image receiver 210 transmits the received 3D image to the image processor 220.

The image processor 220 performs signal-processing such as video decoding, format analysis, and video scaling, and GUI-adding with respect to the received 3D image.

In detail, the image processor 220 generates a left-eye image and a right-eye image which correspond to the size of one scene (1920*1080) using the format of the 3D image received from the image receiver 210.

That is, if the 3D image has a format according to the top-bottom scheme, the side by side scheme, the horizontal interleave scheme, the vertical interleave scheme, or the checker board scheme, the image processor 220 extracts a left-eye image part and a right-eye image part from each image frame and up-scales or interpolates the extracted left-eye image part and the extracted right-eye image part, thereby generating a left-eye image and a right-eye image to be provided to the user.

Also, if the format of the 3D image is a general frame sequence format, the image processor 220 extracts a left-eye image or a right-eye image from each frame and prepares providing it to the user.

Information regarding the format of the 3D image may be included in a 3D image signal or not.

For example, if the information regarding the format of the 3D image is included in the 3D image signal, the image processor 220 analyzes the 3D image and extracts the information regarding the format of it, and processes the 3D image according to the extracted information. On the other hand, if the information regarding the format of the 3D image is not included in the 3D image signal, the image processor 220 processes the 3D image according to a format input by the user or a pre-set format.

Also, the image processor 220 adds the GUI received from the GUI generator 250 to the left-eye image, the right-eye image, or both of them.

The image processor 220 performs time division with respect to the extracted left-eye image and the extracted right-eye image and alternately transmits the left-eye image and the right-eye image to the image display unit 230. That is, the image processor 220 transmits the left-eye image and the right-eye image to the image display unit 230 in the order of the left-eye image L1, the right-eye image R1, the left-eye image L2, the right-eye image R2, and so on.

The image display unit 230 alternately outputs the left-eye image and the right-eye image output from the image processor 220.

The GUI generator 250 generates a GUI to be displayed on a display. The GUI generated by the GUI generator 250 is transmitted to the image processor 220 such that it is added to the left-eye, right-eye or both of them to be displayed on the display.

The storage unit 260 is a storage medium which stores diverse programs necessary for operating the TV 200, and may be implemented as a memory or a hard disk drive (HDD).

The user command receiver 270 transmits a user command received through an inputting means such as a remote controller to the controller 240.

The IR transmitter 280 generates a sync signal which is synchronized with the left-eye image and the right-eye image alternately output, and transmits the generated sync signal to the shutter glasses 300 as the IR. This is to open and close the shutter glasses 300 alternately through the synchronization between the TV 200 and the shutter glasses 300 such that the left-eye image is displayed on the image display unit 230 at the left-eye open timing of the shutter glasses 300 and the right-eye image is displayed on the image display unit 230 at the right-eye open timing of the shutter glasses 300.

The communication interface 190 is used to receive state information of the shutter glasses 300 by communicating with the shutter glasses 300. The state information may be information as to whether the user wears the shutter glasses 300 or not or information as to a charging state of the shutter glasses 300.

The information as to whether the user wears the shutter glasses 300 or not indicates whether power is supplied to respective components of the shutter glasses 300 or not when a switch provided on the shutter glasses 300 is turned on.

As described above, the communication interface 190 receives the state information of the shutter glasses 300 and transmits it to the controller 140.

The controller 240 controls the overall operation of the TV 200 according to a user command received from the user command receiver 270. The controller 240 controls the image receiver 210 and the image processor 220 to receive the 3D image, divide the 3D image into the left-eye image and the right-eye image, and scale or interpolate the left-eye image and the right-eye image to be fitted to the size of a single screen.

Also, the controller 240 controls the GUI generator 250 to generate a GUI corresponding to a user command received from the user command receiver 270, and controls the IR transmitter 280 to generate and transmit a sync signal which is synchronized with the output timing of the left-eye image and the right-eye image.

Also, the controller 240 controls the image processor 120 and the GUI generator 150 to display a 3D image corresponding to the state information of the shutter glasses 300 received through the communication interface 290 on the screen and to generate a GUI corresponding to the state information. A detailed description thereof will be provided below.

The shutter glasses 300 open and close a left-eye glass and a right-eye glass alternately according to the sync signal received from the TV 200 so that the user watches the left-eye image and the right-eye image through the left-eye glass and the right-eye glass, respectively. Hereinafter, a detailed configuration of the shutter glasses 300 will be explained below with reference to FIG. 4.

Figure 4:
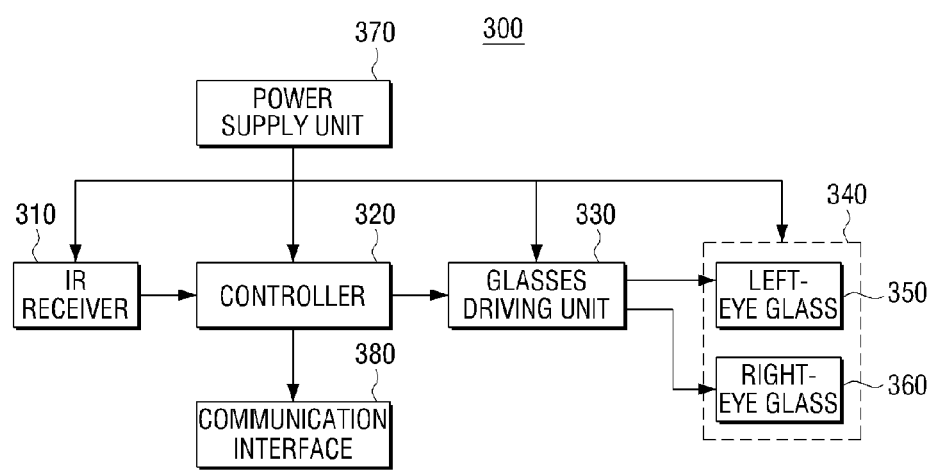
FIG. 4 is a block diagram illustrating shutter glasses according to an exemplary embodiment.

FIG. 4 is a block diagram illustrating the shutter glasses 300 according to an exemplary embodiment. As shown in FIG. 4, the shutter glasses 300 include an IR receiver 310, a controller 320, a glasses driving unit 330, a glasses unit 340, a power supply unit 370, and a communication interface 380.

The IR receiver 310 receives a sync signal for a 3D image from the IR transmitter 280 of the TV 200 which is connected to the shutter glasses 300 in a wired or wireless manner. In particular, the IR receiver 280 radiates the sync signal using infrared ray having directionality, and the IR receiver 310 receives the sync signal from the radiated infrared ray.

For example, the sync signal transmitted from the IR transmitter 280 to the IR receiver 310 is a signal in which a high level and a low level alternate at predetermined time intervals, and transmits the left-eye image at the high level time and transmits the left-eye image at the low level time.

The IR receiver 310 transmits the sync signal received from the IR transmitter 280 to the controller 320.

The controller 320 controls the overall operation of the shutter glasses 300. In detail, the controller 320 generates a control signal based on the sync signal received from the IR receiver 310, and transmits the control signal to the glasses driving unit 330 to control the glasses driving unit 330. In particular, the controller 320 controls the glasses driving unit 330 to generate a driving signal for driving the glasses unit 340 based on the sync signal.

The glasses driving unit 330 generates the driving signal based on the control signal received from the controller 320. In detail, since the glasses unit 340 includes a left-eye glass 350 and a right-eye glass 360, the glasses driving unit 330 generates a left-eye driving signal for driving the left-eye glass 350 and a right-eye driving signal for driving the right-eye glass 360, and transmits the left-eye driving signal and the right-eye driving signal to the left-eye glass 350 and the right-eye glass 360, respectively.

As described above, the glasses unit 340 includes the left-eye glass 350 and the right-eye glass 360 and opens and closes the left-eye glass 350 and the right-eye glass 360 according to the driving signal received from the glasses driving unit 380.

The power supply unit 370 supplies power to respective components of the shutter glasses 300 when the shutter glasses 300 are turned on by a switch (not shown) provided thereon.

The communication interface 380 is a connection passage through which to communicate with the TV 200, and is used to transmit the state information of the shutter glasses 300 to the TV 200. In particular, the communication interface 380 transmits the state information as to whether the shutter glasses 300 are turned on or off to the TV 200.

The state information may be transmitted at time intervals which are predefined between the TV 200 and the shutter glasses 300, or may be transmitted when a request for the state information is received from the TV 200.

<Processing of 3D Image>

Hereinafter, a method for processing a 3D image will be explained with reference to FIGS. 5A to 5C. FIGS. 5A to 5C are views illustrating methods for processing the 3D image according to the formats.

Figure 5A:

FIG. 5A illustrates a method for displaying a 3D image if the 3D image is received according to the general frame sequence scheme.

As shown in FIG. 5A, in the 3D image format according to the frame sequence scheme, one left-eye image or one right-eye image is inserted into one frame. Accordingly, the 3D image is input in the order of a frame including a left-eye image L1 photographed by the left-eye camera, a frame including a right-eye image R1 photographed by the right-eye camera, a frame including a left-eye image L2 photographed by the left-eye camera, a frame including a right-eye image R2 photographed by the right-eye camera, and so on, and is displayed in the input order.

FIG. 5B illustrates a method for displaying a 3D image if the 3D image is received according to the side by side scheme.

As shown in FIG. 5B, the 3D image format according to the side by side scheme includes both the left-eye image and the right-eye image in one frame. Specifically, in the 3D image format according to the side by side scheme, the left-eye image and the right-eye image are divided horizontally and the left-eye image and the right-eye image are located on the left and the right, respectively.

According to the side by side format, the TV 200 divides each frame of the received 3D image horizontally into a left-eye image part and a right-eye image part and up-scales the left-eye image part and the right-eye image part two times in a horizontal direction, thereby generating the left-eye image and the right-eye image to be displayed on the screen, and displays the left-eye image and the right-eye image alternately on the screen.

Accordingly, the 3D image is displayed on the screen in the order of a twice enlarged left-eye image of a left part L1 of the image in the first frame, a twice enlarged right-eye image of a right part R1 of the image in the first frame, a twice enlarged left-eye image of a left part L2 of the image in the second frame, a twice enlarged right-eye image of a right part R2 of the image in the second frame, and so on.

Although the method for processing the 3D image of the format according to the side by side scheme was described in the above, a method for processing a 3D image of a format according to the top-bottom scheme can be inferred from the above-explained method. That is, if the 3D image is received according to the top-bottom scheme, the TV 200 divides each frame of the 3D image vertically into a left-eye image part and a right-eye image part and up-scales the left-eye image part and the right-eye image part two times in a vertical direction, thereby generating the left-eye image and the right-eye image to be displayed on the screen, and displays the left-eye image and the right-eye image alternately on the screen.

FIG. 5C illustrates a method for displaying a 3D image if the 3D image is received according to the horizontal interleave scheme.

As shown in FIG. 5C, the 3D image format according to the horizontal interleave scheme includes both the left-eye image and the right-eye in one frame. In detail, in the 3D image format according to the horizontal interleave scheme, the left-eye image and the right-eye image are alternated in the row basis.

If a 3D image of this format is received, the TV 200 divides each frame of the 3D image into left-eye image parts and right-eye image parts by dividing it based on odd rows and even rows, and up-scales the left-eye image part and the right-eye image part two times in a vertical direction, thereby generating the left-eye image and the right-eye image, and displays the left-eye image and the right-eye image alternately on the screen.

Accordingly, the 3D image is displayed on the screen in the order of a twice enlarged left-eye image of odd row parts L1-1, L1-2 of the image in the first frame, a twice enlarged right-eye image of right parts R1-1, R1-2 of the image in the first frame, a twice enlarged left-eye image of left parts L2-1, L2-2 of the image in the second frame, a twice enlarged right-eye image of right parts R2-1, R2-2 of the image in the second frame, and so on.

Regarding the 3D image format of the horizontal interleave scheme, the left-eye image is generated by interpolating the even row parts using the odd row parts of the image in one frame and the right-eye image is generated by interpolating the odd row parts using the even row parts, without up-scaling described above.

Also, without up-scaling or interpolating, the left-eye image is generated by outputting an image only for the odd rows and the right-eye image is generated by outputting an image only for the even rows.

Although the processing on the 3D image format according to the horizontal interleave scheme was described in the above, the processing on the 3D image format according to the vertical interleave scheme or the checker board scheme can be inferred therefrom.

That is, in the 3D image format of the vertical interleave scheme, the left-eye image and the right-eye image are generated by applying an column-based scaling or interpolating rather than the row-based scaling or interpolating, and are alternately output, so that the 3D image can be provided to the user.

Also, in the 3D image format according to the checker board scheme, pixel-based scaling or interpolating or pixel group-based scaling or interpolating may be used.

<Method for Changing a Play Mode>

Hereinafter, a process of changing a screen on the 3D image processed as described above, in particular, a process of changing a play mode based on the state information of the shutter glasses 300 will be explained.

The term "play mode" refers to a concept including a state in which the 3D image is being played, a state in which playing the 3D image is paused, and a state in which recording is being processed.

FIG. 6 is a view illustrating a process of changing a screen when the shutter glasses 300 are tuned on. Referring to the left screen of FIG. 6, an item '▶ Play' 620 is displayed, representing that the TV 200 is currently playing the D3 image.

In the state in which the 3D image is being played, a 3D object 610 is displayed on the screen of the TV 200. FIG. 6 illustrates the 3D object 610 as a circular left-eye image and a circular right-eye image overlapping with each other for the purpose of providing a graphical representation of the 3D image which is time-divided and alternately displayed.

The TV 200 collects the state information of the shutter glasses 300 by communicating with the shutter glasses 300 while the 3D image is being played. The state information refers to information regarding the power on/off state, the battery charging state, and the open and closing state of the shutter glasses 300.

In detail, if the shutter glasses 300 are determined to be turned-on based on the power on/off state information of the shutter glasses 300, the TV 200 continues playing the 3D image, and, if the shutter glasses 300 are determined to be turned-off, the TV 200 pauses playing the 3D image or displays a message requesting the user to wear the shutter glasses 300 or to finish watching the TV 200.

Referring to the top screen on the right of FIG. 6, an item '∥Pause' 620 is displayed, representing that playing the 3D image is paused as the shutter glasses 300 are turned off. That is, when the shutter glasses 300 are turned off, the TV 200 presumes that the user does not wish to watch the 3D image any more based on the state information indicating that the shutter glasses 300 are turned off, and pauses playing the 3D image.

When the shutter glasses 300 are turned off, a GUI 640 including a message which requests the user to wear the shutter glasses 300 or to turn on the shutter glasses 300 may be displayed on the screen as shown in the middle screen on the right of FIG. 6.

Also, when the shutter glasses 300 are turned off, a GUI 650 including a message which asks the user whether to finish watching the 3D image may be displayed on the screen as shown in the bottom screen on the right of FIG. 6.

In any case, if the user switches the shutter glasses 300 to the on-state, the TV 200 returns the 3D image to the play state. That is, when the shutter glasses 300 are turned on, the TV 200 presumed that the user wishes to watch the 3D image again based on the state information indicating that the shutter glasses 300 are turned on, and plays the 3D image which has been once paused.

As described above, the TV 200 can analyze the user's intention based on only the user's action of turning on or off the shutter glasses 300 and take measures actively according to the user's intention. Accordingly, the 3D image can be provided in the play mode taking the user's intention for the 3D image into consideration.

Figure 7:
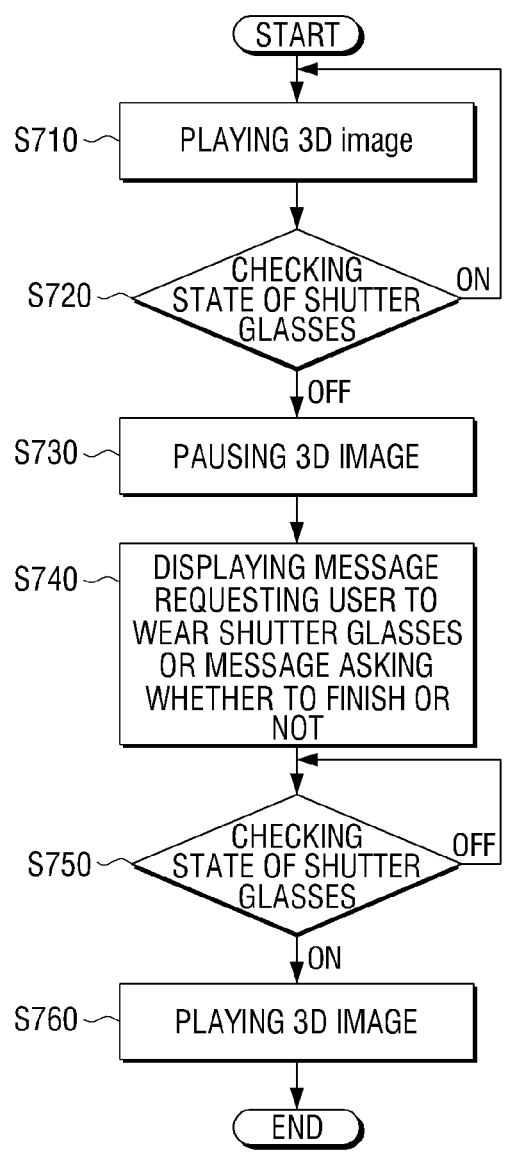
FIG. 7 is a flowchart illustrating a process of changing a play mode.

Hereinafter, a process of automatically changing a play mode will be explained with reference to FIG. 7. FIG. 7 is a flowchart illustrating a method for changing a play mode.

When the 3D image is being played (S710), the TV 200 checks the state of the shutter glasses 300 at predetermined time intervals (S720).

If the shutter glasses 300 are determined to be turned on (S720-N), the TV 200 continues playing the 3D image according to the current play mode (S710), and, if the shutter glasses 300 are determined to be turned off (S720-OFF), the TV 200 pauses playing the 3D image (S730).

Also, at the time of pausing playing the 3D image, a message requesting the user to wear the shutter glasses 300 or to finish watching the 3D image is displayed (S740).

Next, the TV 200 checks again the state of the shutter glasses 300 (S750). If the shutter glasses 300 are still determined to be turned off (S750-OFF), the TV 200 continues pausing playing the 3D image according to the current play mode, and, if the shutter glasses 300 are determined to be turned on (S750-ON), the TV 200 plays the 3D image again (S760).

As described above, the TV 200 can analyze the user's intention based on only the user's action of turning on or off the shutter glasses 300 and take measures adaptively according to the user's intention. Accordingly, the image can be provided in the play mode taking the user's intention for the 3D image into consideration.

Figure 8:
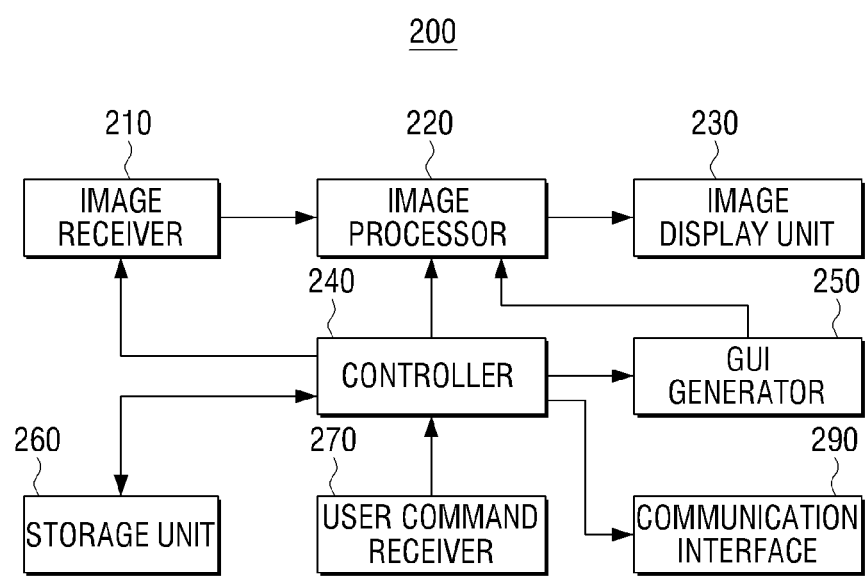
FIG. 8 is a block diagram illustrating a TV according to another exemplary embodiment.
Figure 9:
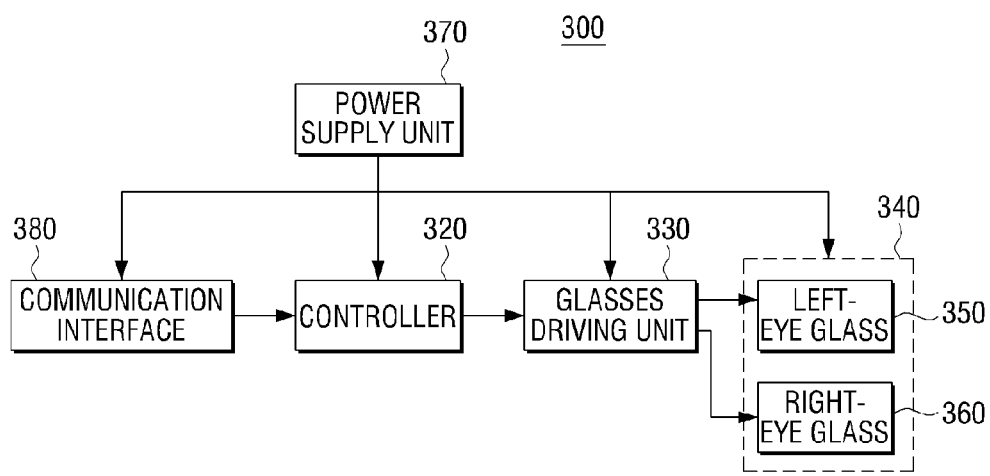
FIG. 9 is a block diagram illustrating shutter glasses according to another exemplary embodiment.

FIG. 8 is a block diagram illustrating a TV 200 according to another exemplary embodiment, and FIG. 9 is a block diagram illustrating shutter glasses 300 according to another exemplary embodiment.

Since FIGS. 8 and 9 are the same as FIGS. 3 and 4 or can be inferred from FIGS. 3 and 4, a difference between FIGS. 8 and 9 and FIGS. 3 and 4 will be mainly explained hereinbelow.

In FIGS. 3 and 4, the TV 200 and the shutter glasses 300 exchange the sync signal according to the IR communication scheme, and, to do so, the TV 200 and the shutter glasses 300 include the IR transmitter 280 and the IR receiver 310, respectively.

However, the TV 200 and the shutter glasses 300 in FIGS. 8 and 9 do not include the IR transmitter 280 and the IR receiver 310.

That is, without requiring the IR transmitter 280 and the IR receiver 310, the TV 200 and the shutter glasses 300 exchange not only the state information but also the sync signal through only the communication interfaces 290, 380, such that the output timing of the left-eye image is synchronized with the open timing of the left-eye glass and the output timing of the right-eye image is synchronized with the open timing of the right-eye glass, and the play mode is changed based on the state information of the shutter glasses 300.

<Method for Changing a Display Mode>

Hereinafter, a process of changing a screen on the 3D image processed as described above, in particular, a process of changing a display mode based on state information of the shutter glasses 300 will be explained.

Figure 10:
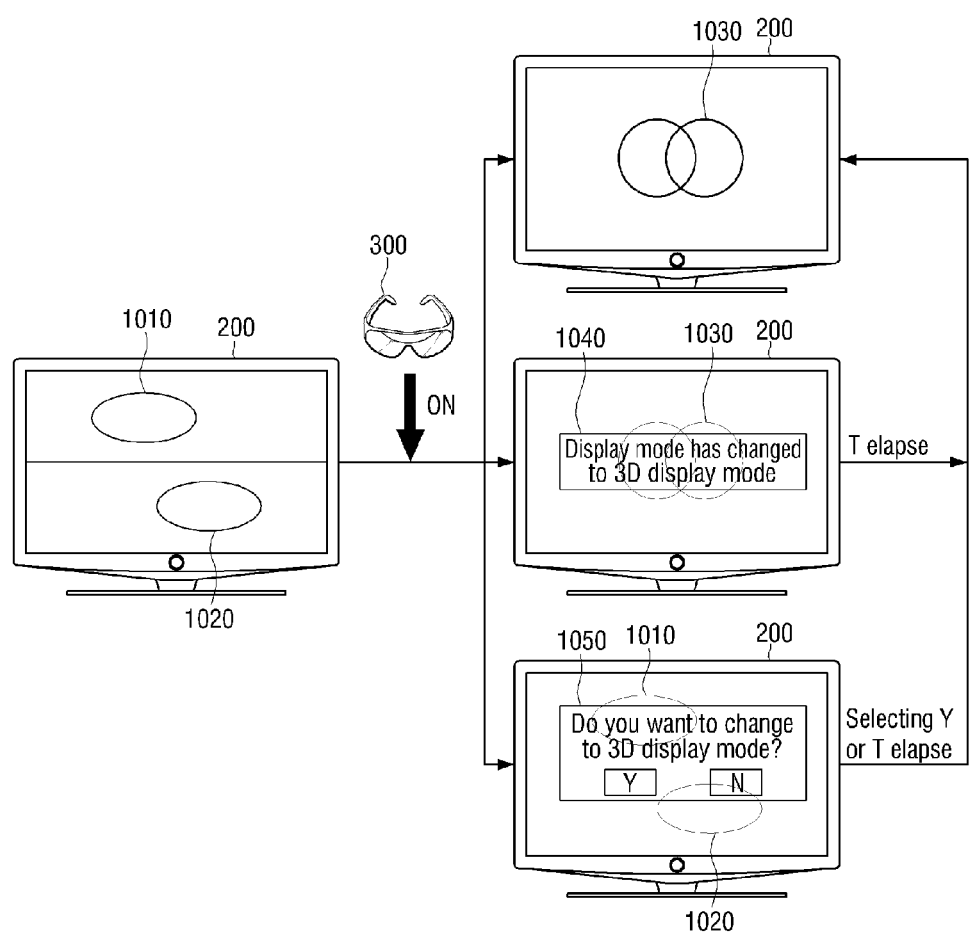

FIG. 10 is a view illustrating a process of changing a screen when the shutter glasses 300 are turned on. If the TV 200 receives a 3D image in a 2D display mode, the TV 200 displays the received 3D image as it is as shown in the left screen of FIG. 10.

That is, the 2D display mode refers a mode in which the 3D mode is in the off-state and each image frame included in the input 3D image is displayed as it is. Accordingly, if the 3D image has a format according to a scheme other than the general frame sequence scheme, the left-eye image and the right-eye image are displayed simultaneously.

It can be seen from FIG. 10 that a 2D object 1010 included in the left-eye image and a 2D object 1020 included in the right-eye image are vertically divided and displayed on one screen, and accordingly, it can be seen that a 3D image of a format according to the top-bottom scheme is being received.

On the other hand, in a 3D display mode in which the 3D mode is in the on-state, each image frame included in the input 3D image is divided into a left-eye image part and a right-eye image part according to the format applied, the divided left-eye image part and the divided right-eye image part are up-scaled to thus generate the left-eye image and the right-eye image, and the left-eye image and the right-eye image are time-divided and are alternately displayed.

If the 3D image is received in the 2D display mode, the TV 200 collects the state information of the shutter glasses 300 by communicating with the shutter glasses 300. The state information is information regarding the power on/off state, the battery charging state, and the opening and closing state of the shutter glasses 300.

The TV 200 collects the state information regarding the power on/off state of the shutter glasses 300, and, if the shutter glasses 300 are determined to be turned off, the TV 200 maintains the 2D display mode as it is, and, if the shutter glasses 300 are determined to be turned on, the TV 200 changes the 2D display mode to the 3D display mode or displays a message requesting the user to change to the 3D display mode.

Referring to the top screen on the right of FIG. 10, the TV 200 identifies that the shutter glasses 300 are turned on based on the state information and that the display mode is changed to the 3D display mode. As described above, in the 3D display mode, the 3D image is divided into a left-eye image part and a right-eye image part according to the format applied, the divided left-eye image part and the divided right-eye image part are up-scaled to thus generate the left-eye image and the right-eye image, and the left-eye image and the right-eye image are time-divided and alternately displayed.

Accordingly, the TV 200 displays a 3D object 1030 instead of 2D objects 1010, 1020 on the screen. FIG. 10 illustrates the 3D object 1030 as a circular left-eye image and a circular right-eye image overlapping with each other in order to provide a graphical representation of the 3D image being time-divided and alternately displayed.

Also, as shown in the middle screen on the right of FIG. 10, a GUI 1040 including a message informing that the display mode has been changed to the 3D display mode may be displayed at the time of changing to the 3D display mode. In this case, if a predetermined time T elapses, the GUI 1040 may automatically disappear and only the 3D object 1030 may be displayed on the screen.

Also, as shown in the bottom screen on the right of FIG. 10, a GUI 1050 including a message asking whether to change to the 3D display mode may be displayed on the screen without directly changing to the 3D display mode. In this case, the user may make the GUI 1050 disappear by pressing an operation button on the TV 200 or on a remote controller to change to the 3D display mode. Also, if a predetermined time T elapses without a selection, the GUI 1050 may automatically disappear and the display mode is changed to the 3D display mode.

As described above, based on only the user's action of turning on the shutter glasses 300, the TV 200 can analyze the user's intention and actively take measures according to the user's intention. Accordingly, the image can be provided in the display mode taking the user's intention for the 3D image into consideration.

Figure 11:
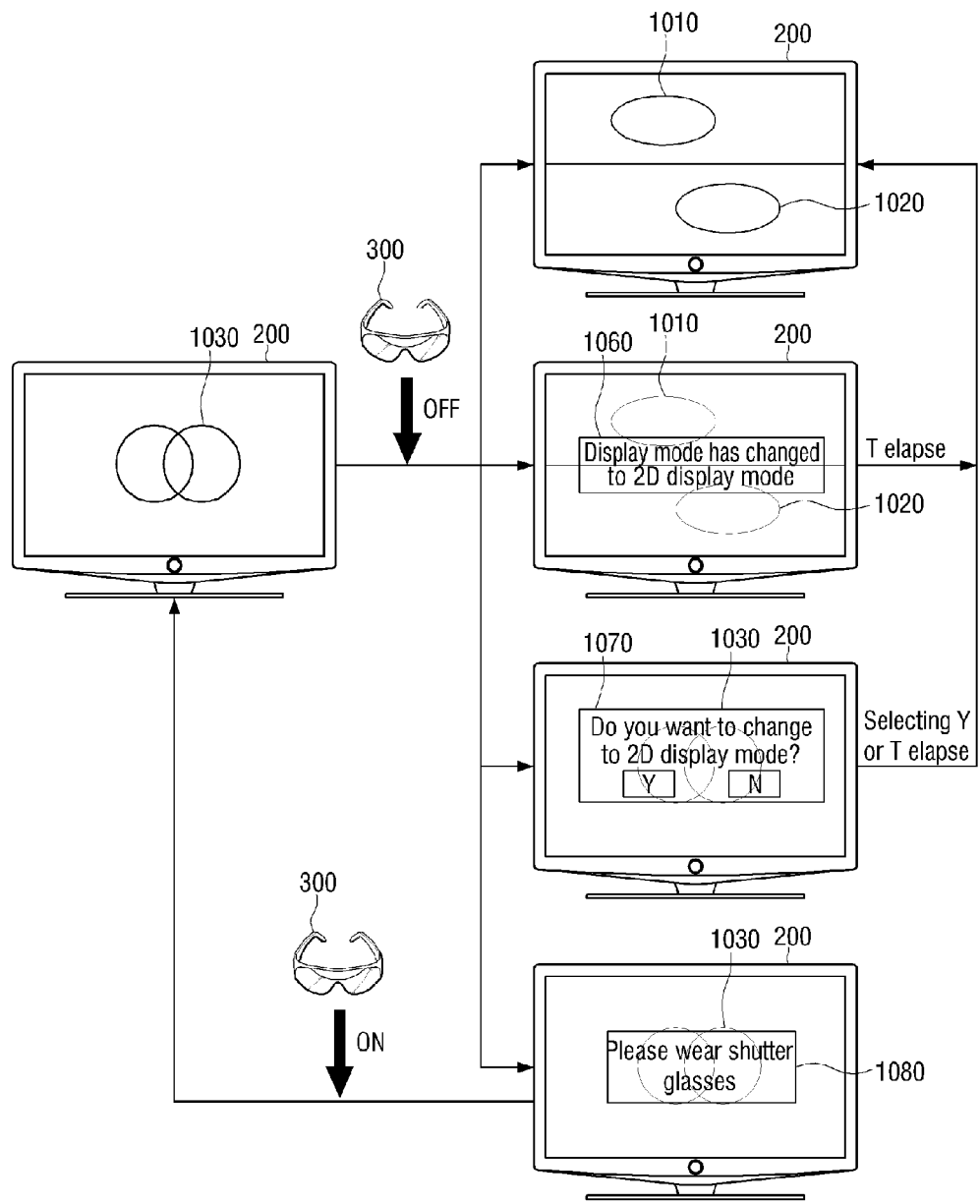
FIG. 11 is a view illustrating a process of changing a screen when the shutter glasses are turned off.

FIG. 11 is a view illustrating a process of changing a screen if the shutter glasses 300 are turned off. If the TV 200 is in the 3D display mode, the TV 200 divides each image frame included in the input 3D image into a left-eye image part and a right-eye image part according to the format applied, up-scales the divided left-eye image part and the divided right-eye part to thus generate the left-eye image and the right-eye image, time-divides the left-eye image and the right-eye image and alternately displays them, as shown in the left screen of FIG. 11.

As a result, a 3D object 1030 is displayed on the screen.

The TV 200 collects state information of the shutter glasses 300 by communicating with the shutter glasses 300 at predetermined time intervals, or receives state information from the shutter glasses 300 whenever the state of the shutter glasses 300 is changed.

Accordingly, if the shutter glasses 300 are determined to be turned-off, the TV 200 changes the 3D display mode to the 2D display mode or displays a message requesting the user to change to the 2D display mode or a message requesting the user to turn on the shutter glasses 300.

Referring to the first screen on the right of FIG. 11, the TV 200 identifies that the shutter glasses 300 are turned off based on the state information and that the display mode is changed to the 2D display mode. As described above, in the second display mode, each image frame included in the input 3D image is displayed as it is.

Accordingly, the TV 200 displays 2D objects 1010, 1020 being vertically separated instead of the 3D object 1030 on the screen, and is aware of that the 3D image of the format of the top-bottom scheme has been received based on the vertically separated 2D objects 1010, 1020.

As shown in the second screen on the right of FIG. 11, a GUI 1060 including a message informing that the display mode has been changed to the 2D display mode may be displayed along with the 2D objects 1010, 1020.

Also, as shown in the third screen and the fourth screen on the right of FIG. 11, the TV 200 may add to the 3D object 1030 a GUI 1070 including a message requesting the user to change to the 2D display mode or a GUI 1080 including a message requesting the user to turn on or wear the shutter glasses 300, while maintaining the output state of the 3D image.

Also, in the case of the second screen on the right of FIG. 11, if a predetermined time T elapses, the GUI 1060 may disappear automatically and only the 2D objects 1010, 1020 may be displayed on the screen as shown in the first screen on the right. In the case of the third screen on the right of FIG. 11, if a predetermined time T elapses or a user requests change to the 2D display mode, the GUI 1070 may disappear and only the 2D object 1020 may be displayed on the screen as shown in the first screen on the right.

Also, in the case of the fourth screen on the right of FIG. 11, if the user wears the shutter glasses 300 again, that is, if the shutter glasses 300 are turned on, the GUI 1080 may disappear and only the 3D object 1030 may be displayed on the screen.

As described above, the TV 200 can analyze the user's intention based on only the user's action of turning off the shutter glasses 300 and actively take measures according to the user's intention. Accordingly, the image can be provided in the display mode taking the user's intention for the 3D image into consideration.

Figure 12:
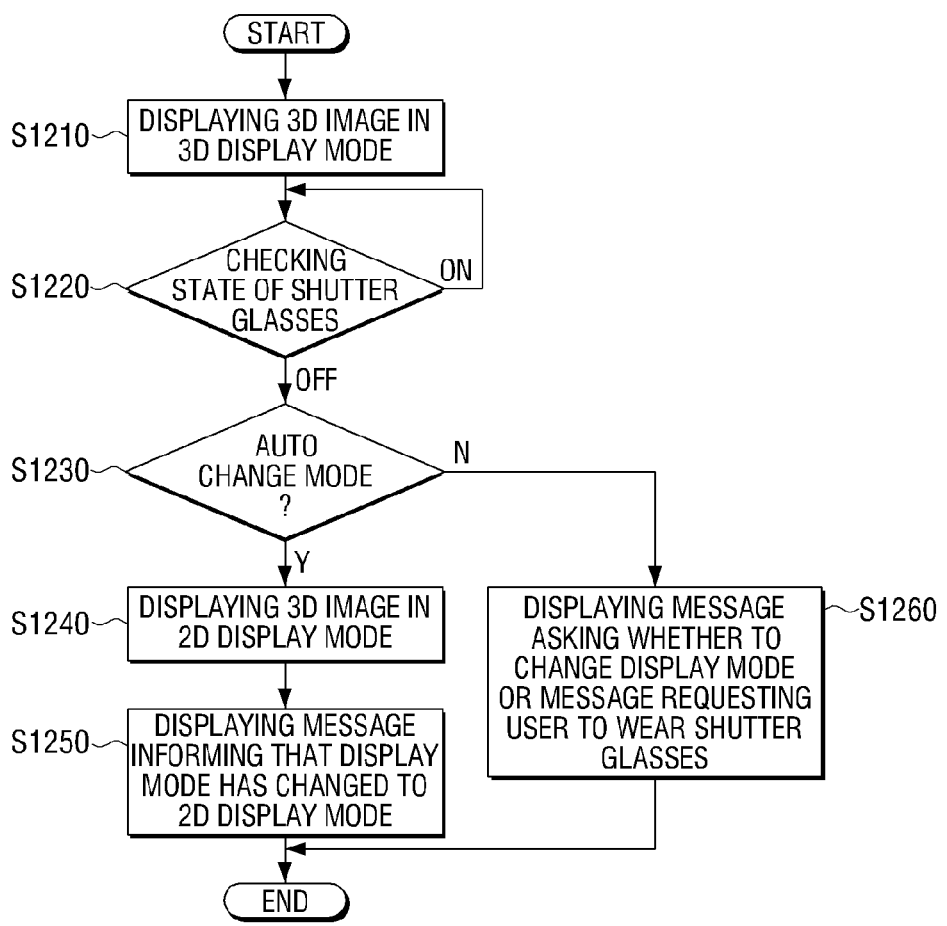
FIG. 12 is a flowchart illustrating a process of changing a display mode.

Hereinafter, a process of automatically changing a display mode will be described with reference to FIG. 12. FIG. 12 is a flowchart illustrating a method for changing a display mode.

When a 3D image is being displayed in a 3D display mode (S1210), the TV 200 checks the state of the shutter glasses 300 at predetermined time intervals.

If the shutter glasses 300 are determined to be turned on (S1220-ON), the TV 200 continues displaying the 3D image in the current 3D display mode (S1210), and, if the shutter glasses 300 are determined to be turned off (S1220-OFF), the TV 200 determined whether an auto change mode is set or not (S1230). That is, the above-described display mode auto change can be previously set by the user.

If the auto change mode is set by the user (S1230-Y), the TV 200 displays the 3D image in the 2D display mode (S1240) and displays a message informing that the display mode has been changed to the 2D display mode (S1250). Of course, only one of operations S1240 and S1250 may be performed as described above.

If the auto change mode is not set by the user (S1230-N), the TV 200 displays a message asking whether to change the display mode or a message requesting the user to wear the shutter glasses 300 on the screen (S1260).

As described above, the TV 200 can analyze the user's intention based on only the user's action of turning on or off the shutter glasses 300 and can actively take measures according to the user's intention. Accordingly, the image can be provided in the display mode taking the user's intention for the 3D image into consideration.

Figure 13:
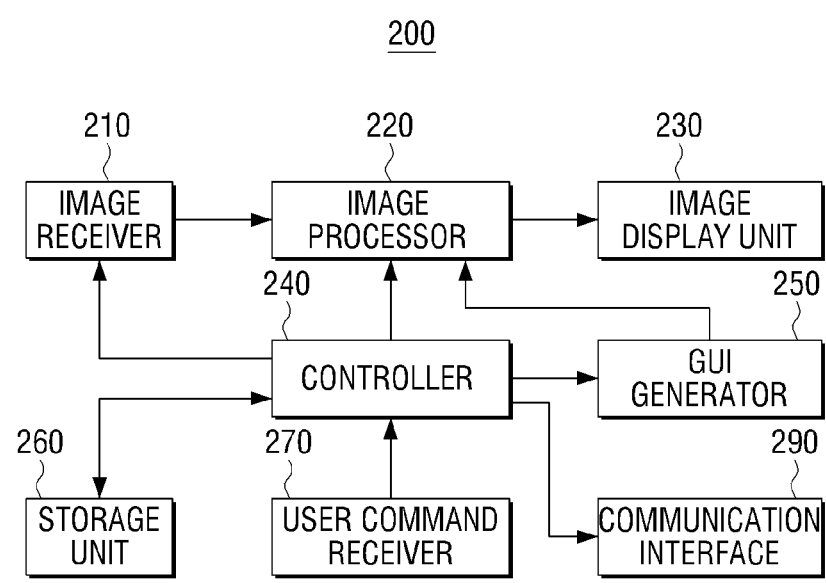
FIG. 13 is a block illustrating a TV according to still another exemplary embodiment.
Figure 14:
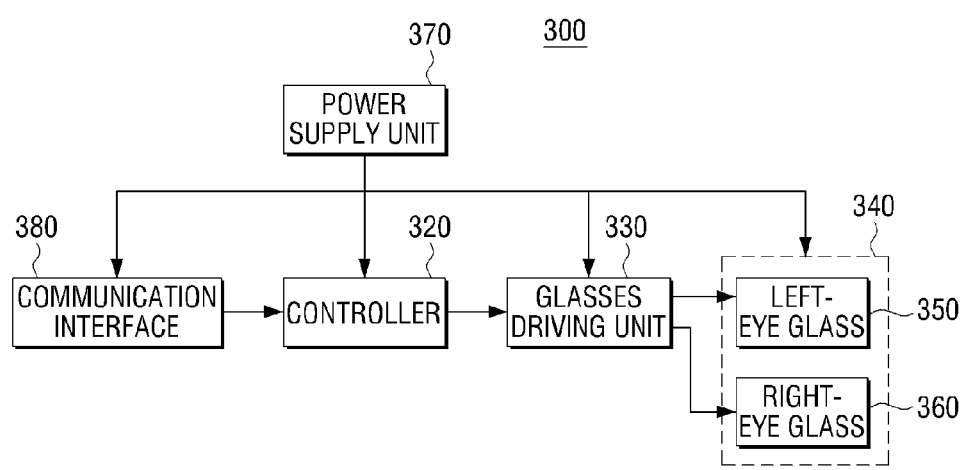
FIG. 14 is a block diagram illustrating shutter glasses according to still another exemplary embodiment.

FIG. 13 is a block diagram illustrating a TV 200 according to still another exemplary embodiment, and FIG. 14 is a block diagram illustrating shutter glasses 300 according to still another exemplary embodiment.

Since FIGS. 13 and 14 are the same as FIGS. 4 and 5 or can be inferred from FIGS. 4 and 5, a difference of FIGS. 13 and 14 from FIGS. 4 and 5 will be mainly described.

In FIGS. 3 and 4, the TV 200 and the shutter glasses 300 exchange the sync signal according to the IR communication scheme, and to do so, the TV 200 and the shutter glasses 300 include the IR transmitter 280 and the IR receiver 310, respectively.

However, the TV 200 and the shutter glasses 300 of FIGS. 13 and 14 do not include the IR transmitter 280 and the IR receiver 310.

That is, the TV 200 and the shutter glasses 30 exchange not only the state information but also the sync signal through the communication interfaces 290, 380, without requiring the IR transmitter 280 and the IR receiver 310, such that the output timing of the left-eye image is synchronized with the open timing of the left-eye glass and the output timing of the right-eye image is synchronized with the open timing of the right-eye glass, and the display mode is changed based on the state information of the shutter glasses 300.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for changing a play mode for a three-dimensional (3D) image, the method comprising:
   determining a state of shutter glasses based on a signal received from the shutter glasses;
   generating a graphic user interface (GUI) based on the determined state of the shutter glasses, the GUI being configured to receive a user input to change a play mode displaying the GUI; and
   changing the play mode according to the user input to change the play mode received through the GUI.

2. The method as claimed in claim 1, wherein the state of the shutter glasses indicates at least one of a power on/off state, a battery charging state and an opening and closing state of the shutter glasses.

3. The method as claimed in claim 1, wherein the displaying automatically pauses playing the 3D image if the determined state of the shutter glasses indicates that the shutter glasses are turned off while the 3D image is being played.

4. The method as claimed in claim 1, further comprising, if the determined state of the shutter glasses indicates that the shutter glasses are turned on while playing the 3D image is paused, automatically playing the 3D image.

5. The method as claimed in claim 1, further comprising, if the determined state of the shutter glasses indicates that the shutter glasses are turned off while the 3D image is being played, displaying a request message requesting the shutter glasses to be turned on.

6. The method as claimed in claim 5, further comprising terminating the displaying of the request message if the state of the shutter glasses is newly determined, the newly determined state of the shutter glasses indicating that the shutter glasses are turned on, after determining the state of the shutter glasses indicating that the shutter glasses are turned off.

7. The method as claimed in claim 1, wherein displaying displays a message asking whether to play the 3D image if the determined state of the shutter glasses indicates that the shutter glasses are turned on while playing of the 3D image is paused.

8. The method as claimed in claim 1, wherein the shutter glasses transmit the signal based on at least one of a predetermined time interval and whether a request for the signal is received.

9. A method for changing between a three-dimensional (3D) display mode and a two-dimensional (2D) display mode, the method comprising:
   determining a state of shutter glasses based on a signal received from the shutter glasses;
   generating a graphic user interface (GUI) based on the determined state of the shutter glasses, the GUI being configured to receive a user input to change a display mode;
   displaying the GUI; and
   changing the display mode according to the user input to change the display mode received through the GUI.

10. The method as claimed in claim 9, wherein the state of the shutter glasses indicates at least one of a power on/off state, a battery charging state and an opening and closing state of the shutter glasses.

11. The method as claimed in claim 9, wherein, if the determined state of the shutter glasses indicates that the shutter glasses are turned off while in the 3D display mode, the changing changes the 3D display mode to the 2D display mode.

12. The method as claimed in claim 9, wherein, if the determined state of the shutter glasses indicates that the shutter glasses are turned on while in the 2D display mode, the changing changes from the 2D display mode to the 3D display mode.

13. The method as claimed in claim 9, further comprising displaying a first message requesting the shutter glasses to be turned on if the determined state of the shutter glasses indicates that the shutter glasses are turned off while in the 3D display mode.

14. The method as claimed in claim 13, further comprising terminating the displaying of the first message if the state of the shutter glasses is newly determined and the newly determined state of the shutter glasses indicates that the shutter glasses are turned on, after determining the state of the shutter glasses indicating that the shutter glasses are turned off.

15. The method as claimed in claim 9, further comprising, if the state of the shutter glasses indicates that the shutter glasses are turned on while in the 2D display mode, displaying a message asking whether to change to the 3D display mode.

16. The method as claimed in claim 9, wherein the shutter glasses transmit the signal based on at least one of a predetermined time interval or whether a request for the signal is received.

17. The method as claimed in claim 9, wherein the 3D display mode is a mode in which a left-eye image and a right-eye image of a 3D image are displayed alternately on a screen, and the 2D display mode is a mode in which the left-eye image and the right-eye image are separately displayed on the screen.

18. A display apparatus for displaying a three-dimensional (3D) image, the display apparatus comprising:
a communication interface configured to receive a signal from shutter glasses;
a controller configured to determine a state of the shutter glasses based on the received signal; and
a graphic user interface (GUI) generator configured to generate a GUI based on the determined state of the shutter glasses, the GUI being configured to receive a user input to change a play mode,
wherein the controller changes the play mode according to the user input to change the play mode received through the GUI.

19. The display apparatus as claimed in claim 18, wherein the state of the shutter glasses indicates at least one of a power on/off state, a battery charging state and an opening and closing state of the shutter glasses.

20. The display apparatus as claimed in claim 18, wherein, if the determined state of the shutter glasses indicates that the shutter glasses are tuned off while the 3D image is being played, the controller automatically pauses playing the 3D image.

21. The display apparatus as claimed in claim 18, wherein, if the determined state of the shutter glasses indicates that the shutter glasses are turned on while playing of the 3D image is paused, the controller automatically plays the 3D image.

22. The display apparatus as claimed in claim 18, wherein, if the determined state of the shutter glasses indicates that the shutter glasses are turned off while the 3D image is being played, the controller controls a displaying of a request message requesting the shutter glasses to be turned on.

23. The display apparatus as claimed in claim 22, wherein, if the state of the shutter glasses is newly determined and the newly determined state of the shutter glasses indicates that the shutter glasses are turned on, after determining the state of the shutter glasses indicating that the shutter glasses are turned off, the controller terminates the displaying of the request message.

24. The display apparatus as claimed in claim 18, wherein, if the determined state of the shutter glasses indicates that the shutter glasses are turned on while playing the 3D image is paused, the controller displays a 3D image playing message asking whether to play the 3D image.

25. The display apparatus as claimed in claim 18, wherein the shutter glasses transmit the signal based on at least one of a predetermined time interval and whether a request for the signal is received.

26. A display apparatus which operates in a three-dimensional (3D) display mode and a two-dimensional (2D) display mode, the display apparatus comprising:
a communication interface configured to receive a signal from shutter glasses;
a controller configured to determine a state of the shutter glasses based on the received signal; and
a graphic user interface (GUI) generator configured to generate a GUI based on the determined state of the shutter glasses, the GUI being configured to receive a user input to change a display mode,
wherein the controller changes the display mode according to the user input to change the display mode received through the GUI.

27. The display apparatus as claimed in claim 26, wherein the state of the shutter glasses indicates at least one of a power on/off state, a battery charging state and an opening and closing state of the shutter glasses.

28. The display apparatus as claimed in claim 26, wherein, if the determined state of the shutter glasses indicates that the shutter glasses are turned off while in the 3D display mode, the controller automatically changes from the 3D display mode to the 2D display mode.

29. The display apparatus as claimed in claim 26, wherein, if the determined state of the shutter glasses indicates that the shutter glasses are turned on while in the 2D display mode, the controller automatically changes from the 2D display mode to the 3D display mode.

30. The display apparatus as claimed in claim 26, wherein, if the determined state of the shutter glasses indicates that the shutter glasses are turned off while in the 3D display mode, the controller controls a displaying of a request message requesting the shutter glasses to be turned on.

31. The display apparatus as claimed in claim 30, wherein, if the state of the shutter glasses is newly determined and the newly determined state of the shutter glasses indicates that the shutter glasses are turned on, after displaying the request message, the controller terminates the displaying of the request message.

32. The display apparatus as claimed in claim 26, wherein, if the determined state of the shutter glasses indicates that the shutter glasses are turned on while in the 2D display mode, the controller controls a displaying of a 3D playing message asking whether to change to the 3D display mode.

33. The display apparatus as claimed in claim 26, wherein the shutter glasses transmit the signal based on at least one of a predetermined time interval and whether a request for the signal is received.

34. The display apparatus as claimed in claim 26, wherein in the 3D display mode, a left-eye image and a right-eye image of a 3D image are displayed alternately on a screen, and wherein in the 2D display mode, the left-eye image and the right-eye image are separately displayed on the screen.

35. A three-dimensional (3D) image providing system comprising:
   shutter glasses configured to open and close a left-eye glass and a right-eye glass alternately based on a sync signal received from an external source, and transmit a signal regarding a state of the shutter glasses; and
   a display apparatus configured to determine the state of the shutter glasses based on the received signal, generate a graphic user interface (GUI) based on the determined state of the shutter glasses, the GUI being configured to receive a user input to change a play mode, and changes the play mode according to the user input to change the play mode received through the GUI.

36. A three-dimensional (3D) image providing system comprising:
   shutter glasses configured to open and close a left-eye glass and a right-eye glass alternately based on a sync signal received from an external source, and transmit a signal regarding a state of the shutter glasses; and
   a display apparatus configured to operate in a 3D display mode and a 2D display mode, determine the state of the shutter glasses based on the received signal, generate a graphic user interface (GUI) based on the determined state of the shutter glasses, the GUI being configured to receive a user input to change a display mode, and changes the display mode according to the user input to change the display mode received through the GUI.

\* \* \* \* \*